United States Patent
Gaydos

[11] Patent Number: 6,132,150
[45] Date of Patent: Oct. 17, 2000

[54] THREE-DIMENSIONAL APPARATUS FOR A ROUTER FOR PRODUCING COPIES VARIATIONS OF TEMPLATES

[76] Inventor: George G. Gaydos, 509 Peebles St., Apartment 3, Pittsburgh, Pa. 15221

[21] Appl. No.: 09/206,648

[22] Filed: Dec. 7, 1998

[51] Int. Cl.$^7$ .................................................. B23C 1/18
[52] U.S. Cl. ............................ 409/124; 409/93; 409/109
[58] Field of Search .................................. 409/86, 90, 93, 409/109, 124, 126, 130, 125

[56] References Cited

U.S. PATENT DOCUMENTS

| | | | |
|---|---|---|---|
| 477,229 | 6/1892 | Rohlmann | 83/818 |
| 571,535 | 11/1896 | Lochman | 409/111 |
| 701,903 | 6/1902 | Lochman | 409/93 |
| 1,721,015 | 7/1929 | Galbraith | 409/108 |
| 2,018,763 | 10/1935 | Kirby | 90/13.3 |
| 2,093,009 | 9/1937 | Galbraith | 90/13.2 |
| 2,796,095 | 6/1957 | Joseph | 144/291 |
| 3,171,207 | 3/1965 | Wormser | 33/23 |
| 3,211,061 | 10/1965 | Cretsinger | 90/13.2 |
| 3,301,287 | 1/1967 | Edwards | 144/144 |
| 3,434,385 | 3/1969 | Ray | 90/13.1 |
| 3,453,933 | 7/1969 | Kornhauser | 90/13.2 |
| 4,095,633 | 6/1978 | Kimball et al. | 144/144 |
| 4,098,170 | 7/1978 | Russell | 90/13.1 |
| 4,183,284 | 1/1980 | Laskowski | 90/13.3 |
| 4,227,557 | 10/1980 | Allen | 142/7 |
| 4,278,117 | 7/1981 | Mitchell et al. | 144/144 |
| 4,300,863 | 11/1981 | Partain | 409/109 |
| 4,364,695 | 12/1982 | Lenz | 409/103 |
| 5,569,004 | 10/1996 | Marantette | 409/235 |
| 5,993,123 | 11/1999 | Allred, III et al. | 409/109 |

*Primary Examiner*—Stephen F. Gerrity
*Assistant Examiner*—Adrian M. Wilson
*Attorney, Agent, or Firm*—James Ray & Associates

[57] ABSTRACT

A three-dimensional apparatus for a router for positioning and guiding the router to produce, from a workpiece, at least one of a substantial duplicate of a three-dimensional configuration of a template and a substantial variation of such three-dimensional configuration of such template by routing such workpiece. The three-dimensional apparatus for a router including a workpiece mounting platform for mounting the workpiece, a template mounting platform for mounting the template, a router mounting platform for mounting the router, a router positioning mechanism for positioning the router mounting platform adjacent to the workpiece mounting platform, a probe for tracing the three-dimensional configuration of the template and a linkage interconnecting the probe and the router mounting platform to move the router mounting platform in response to movement of the probe. The router positioning mechanism including a three-dimensional movement mechanism for permitting movement of the router mounting platform in each of three mutually orthogonal directions.

22 Claims, 3 Drawing Sheets

THREE-DIMENSIONAL APPARATUS FOR A ROUTER FOR PRODUCING COPIES VARIATIONS OF TEMPLATES

FIELD OF THE INVENTION

The present invention relates, in general, to woodworking equipment and, more particularly, this invention relates to an apparatus for use with a widely available router to permit the router to readily and accurately duplicate a three-dimensional contour of an object, for example, a template.

BACKGROUND OF THE INVENTION

As is generally well known in the prior art, routers are in widespread use among carpenters, craftspeople and generally anyone involved in woodworking.

Frequently, a craftsperson (e.g., a woodworker) wishes to duplicate a contour of an existing object so as to reproduce any of a number of already existing decorative or utilitarian designs in wood and/or other materials.

Alternatively, a craftsperson may wish to produce repeated copies of a particular three-dimensional design which may be embodied in a template.

OBJECTS OF THE INVENTION

It is, therefore, one of the primary objects of the present invention to provide a three-dimensional apparatus for a router which allows the router to be utilized in a manner that will enable a more accurate reproduction of a three-dimensional contour of an existing object, for example, a template or an already existing design.

Another object of the present invention is to provide a three-dimensional apparatus which allows the router to produce, working from an existing template, three-dimensional designs in a workpiece which are substantial variations on the three-dimensional design embodied in the template.

A further object of the present invention is to provide an apparatus which is relatively simple in design and rather rugged in construction and, therefore, inexpensive to manufacture and durable in use.

In addition to the objects and advantages of the present invention described above, various other objects and advantages of the invention will become more readily apparent to those persons skilled in the relevant art from the following more detailed description of the invention, particularly, when such description is taken in conjunction with the attached drawing Figures and with the appended claims.

SUMMARY OF THE INVENTION

In one aspect, the invention features a three-dimensional apparatus for a router for positioning and guiding a router to produce, from a workpiece, at least one of a substantial duplicate of a three-dimensional configuration of a template and a substantial variation of such three-dimensional configuration of such template by routing a workpiece. The three-dimensional apparatus for a router includes a workpiece mounting platform for mounting the workpiece, a template mounting platform for mounting the template, a router mounting platform for mounting the router and a router positioning mechanism for positioning the router mounting platform adjacent the workpiece mounting platform. A probe is provided for tracing the three-dimensional configuration of the template and a linkage interconnects the probe and the router mounting platform to move the router mounting platform in response to movement of the probe. The router positioning mechanism includes a three-dimensional movement mechanism for permitting movement of the router mounting platform in each of three mutually orthogonal directions.

In another aspect, the invention generally features a three-dimensional milling apparatus for mounting a milling tool and for producing, in a workpiece, at least one of a substantial reproduction of a template and a substantial variation of the template when the template extends along three separate and independent axes. The milling apparatus includes at least one template platform for mounting the template in a template position, a workpiece platform for mounting the workpiece in a workpiece position and a milling tool support structure for mounting the milling tool in a milling tool position. A probe is provided for determining a surface of the workpiece with respect to the workpiece position and a linkage mechanism determines the milling tool position in response to the determined surface of the workpiece. The template has three separate and independent axes and the linkage means is effective to alter the milling tool position in each of the three separate and independent axes with respect to a position of the probe.

BRIEF DESCRIPTION OF THE DRAWINGS

The invention will now be described by way of a particular preferred embodiment, reference being made to the attached drawings, wherein.

DETAILED DESCRIPTION OF THE PREFERRED EMBODIMENT

Figure 1:
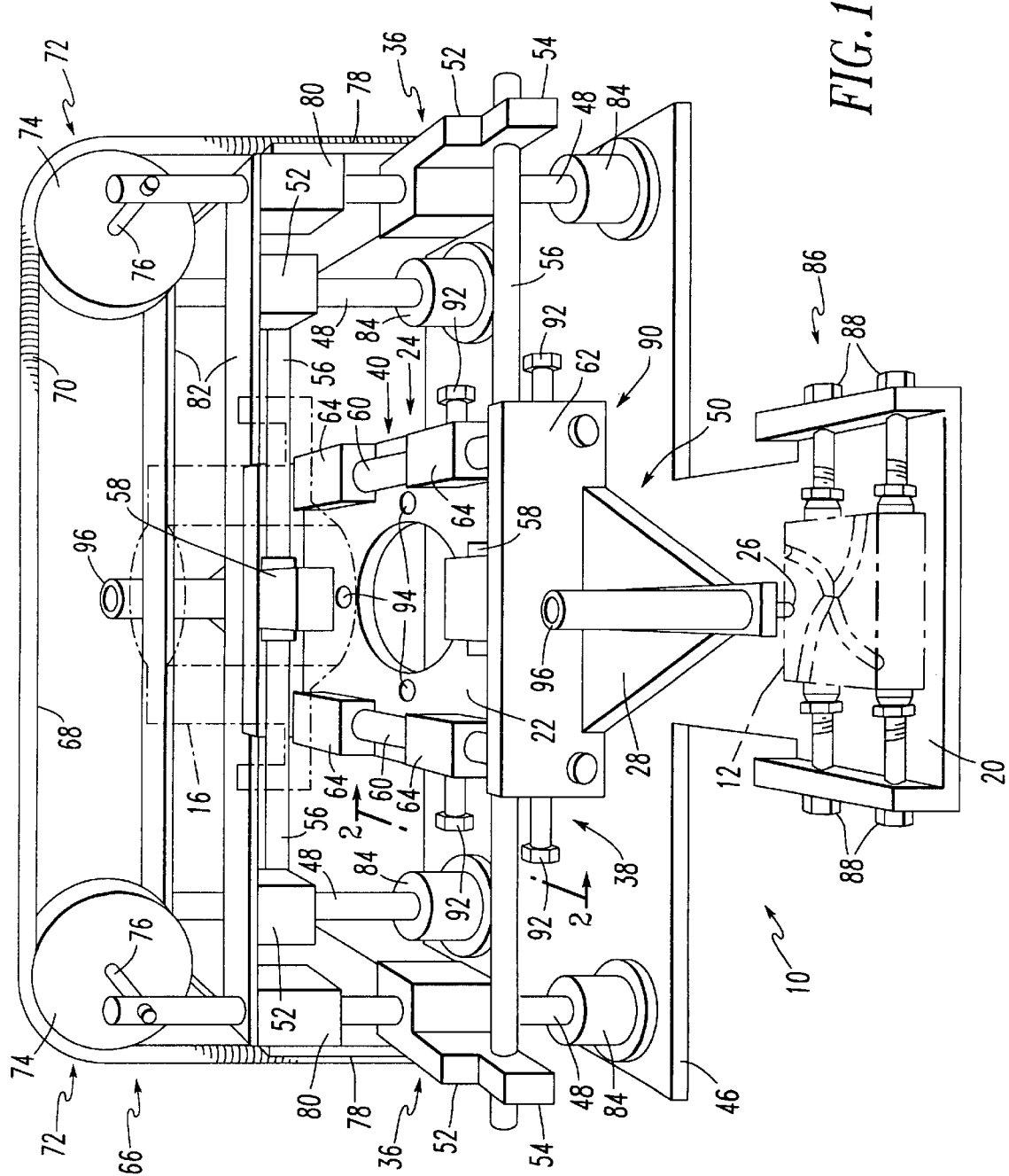
FIG. 1 is frontal perspective of a three-dimensional apparatus for a router according to a presently preferred embodiment of the invention.

Prior to proceeding to the more detailed description of the invention, it should be noted that identical components having identical functions have been identified with identical reference numerals throughout the several views illustrated in the drawing Figures.

Figure 2:
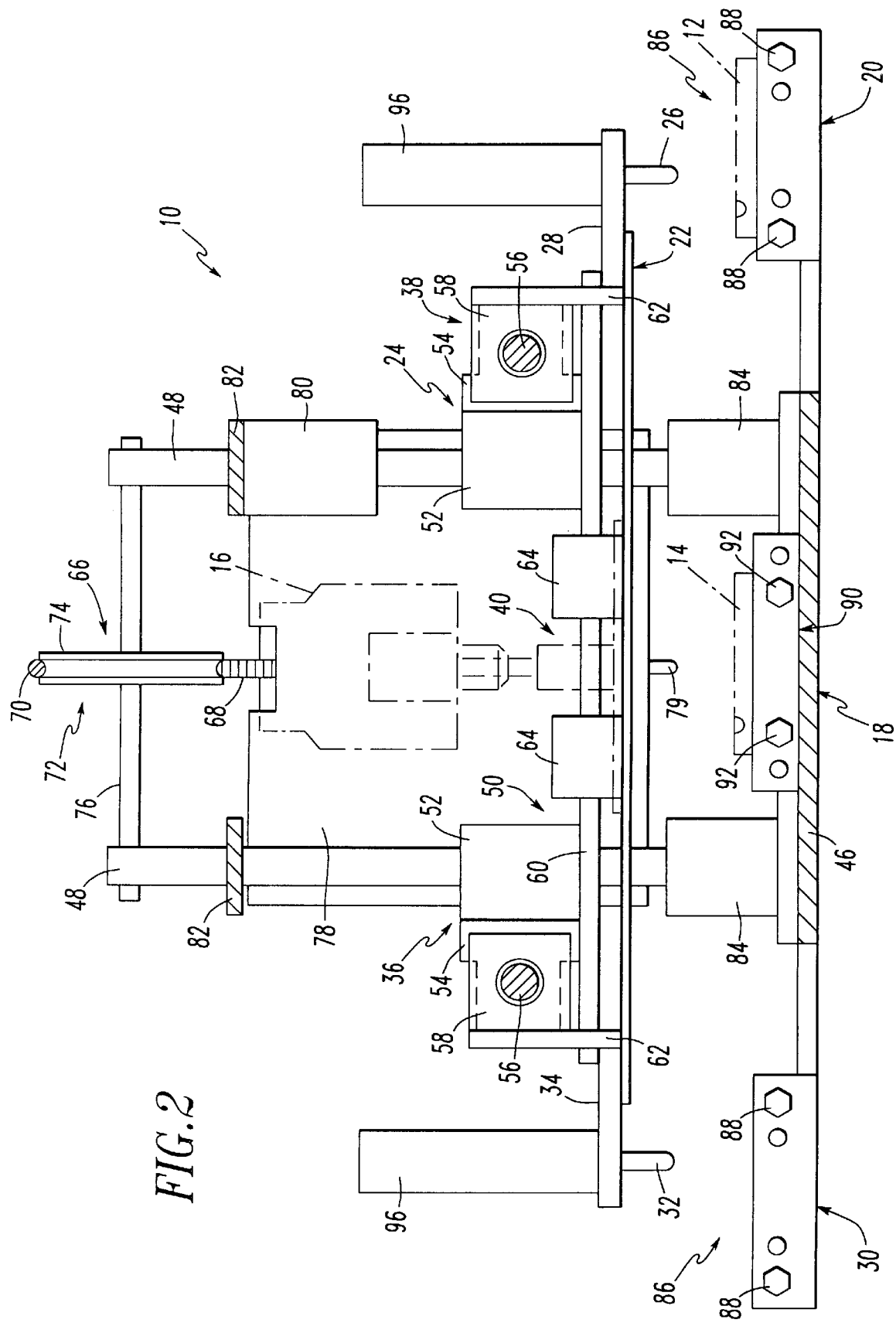
FIG. 2 is a sectional elevational view of the inventive router apparatus taken along the lines shown as 2—2 in FIG. 1.

Referring to FIGS. 1 and 2, a router apparatus adapted for the reproduction of a three-dimensional contour of an object is generally designated by reference numeral 10. An object which already embodies the three-dimensional contour which it is desired to duplicate is generally referred to herein as a "template" and is indicated by reference numeral 12.

While the term "template" is used herein, such term should not be understood to limit the invention to the reproduction only of so-called templates. The invention can be readily used to reproduce a three-dimensional contour of a wide range of existing objects, for example, to duplicate a molding or filigree design in carpentry, etc.

The design is to be duplicated from the template 12 into a workpiece 14, the work being performed by a router, the router being shown generally in phantom and designated by reference numeral 16.

The router apparatus 10 generally includes a workpiece mounting platform 18 for mounting the workpiece 14, a template mounting platform 20 for mounting the template 12 and a router mounting platform 22 for mounting the router 16. The router 16 is positioned adjacent the workpiece 14 and, preferably, is suspended over the workpiece 14 by a router positioning mechanism 24.

As will be explained more fully below, the router positioning mechanism 24, in combination with a counterbalancing mechanism described herein, is effective to permit the router mounting platform 22 and the router 16 mounted thereon to be moved simultaneously through three mutually orthogonal axes, e.g., the x, y and z axes, while additionally supporting the weight of the router mounting platform 22 and the router 16 mounted thereupon, thereby relieving the operator of the router apparatus 10 from supporting such combined weight and allowing for a more controlled and dexterous sculpting of the workpiece 14.

A probe 26 is provided for contacting and tracing (i.e., moving over) a three-dimensional contour of the workpiece 14 and a linkage mechanism connects the probe 26 to the router mounting platform 22 so as to cause the router mounting platform 22 to move in response to movement of the probe 26 as it traces the three-dimensional contour of the workpiece 14. Preferably, as shown in FIGS. 1 and 2, such a linkage mechanism is provided in the form of a rigid offset arm 28 which extends outward from the router mounting platform 22. Additionally, in order to allow for a rapid switching between different templates, the router apparatus 10 preferably includes a second template mounting platform 30 and a second probe 32 positioned thereover by an additional offset arm 34 extending outward from the router mounting platform 22.

The router positioning mechanism 24 permits simultaneous movement of the router mounting platform 22 in three different directions by providing a vertical translation mechanism 36, a first horizontal translation mechanism 38 and a second horizontal translation mechanism 40. The first horizontal translation mechanism 38 and the second horizontal translation mechanism 40 permit movement of the router mounting platform 22 along horizontal axes which are substantially perpendicular to one another and the vertical translation mechanism 36 provides movement of the router platform 22 along an axis which is substantially perpendicular to both of the horizontal movement axes provided by the first and second horizontal translation mechanisms 38 and 40.

Thus, it should be readily apparent that the presently preferred router positioning mechanism 24 permits substantially simultaneous movement of the router mounting platform 22 in each of these three mutually orthogonal directions, i.e., a vertical direction and two mutually perpendicular horizontal directions.

The vertical, first horizontal and second horizontal translation mechanisms 36, 38 and 40, respectively, are preferably provided as slide block bearing assemblies. To this end, the router apparatus 10 includes a base member 46 of generally oblong shape and having four vertical shafts 48 projecting vertically upward from the four corners thereof. Such router mounting platform 22 is mounted on a vertically translatable subassembly 50 which includes the router mounting platform 22, the first and second horizontal translation mechanisms 38 and 40 and at least four vertical bearings 52.

One each of the four vertical bearings 52 slidingly engages one each of the four vertical shafts 48, thereby permitting the vertically translatable subassembly 50 to move vertically with respect to the base member 46 and the four vertical shafts 48. Preferably, the vertical bearings 52 are provided as slide block bearings which substantially surround and slidingly engage the vertical shafts 48.

In order to implement the first horizontal translation mechanism 38, the vertically translatable subassembly 50 further includes four bracket members 54, one each of which extends outward from one each of the vertical bearings 52 and a first set of horizontal shafts 56 which extend between respective pairs of the bracket members 54 on opposite sides of the workpiece mounting platform 18.

A first set of horizontal bearings 58 slidingly engage the first set of horizontal shafts 56 to thereby permit the router mounting platform 22 (and the probe 26 linked thereto by the offset arm 28) to move in a first horizontal direction with respect to the base member 46, with respect to the workpiece mounting platform 18 and with respect to the template mounting platform 20. The first set of horizontal bearings 58 are also preferably provided in the form of slide block bearings which surround and slidingly engage the first set of horizontal shafts 56.

The second horizontal translation mechanism 40 of the router positioning mechanism 24 is preferably implemented by providing the router apparatus 10 with a second set of horizontal shafts 60 that are connected to the first set of horizontal bearings 58 through a pair of flange members 62. Each of the flange members 62 is connected to and extends horizontally from one each of the first set of horizontal bearings 58 and the second set of horizontal shafts 60 are aligned in parallel and extend at substantially right angles to the first set of horizontal shafts 56. A second set of horizontal bearings 64 slidingly engage the second set of horizontal shafts 60 and the second set of horizontal bearings 64 are connected, e.g., by welding or other suitable means, to the router mounting platform 22. Again, preferably, the second set of horizontal bearings 64 are of the slide block type.

In the presently preferred embodiment, the second set of horizontal shafts 60 are positioned vertically above the first set of horizontal shafts 56.

Through the provision of each of the vertical translation mechanism 36, the first horizontal translation mechanism 38 and the second horizontal translation mechanism 40 as described above, the router mounting platform 22 and the probe 26 linked thereto are enabled for simultaneous movement in each of three mutually orthogonal directions.

Since commercially available routers may be of considerable weight and in order to reduce the strain on the operator, the router apparatus 10 additionally preferably includes a counterbalancing mechanism 66 for counterbalancing the combined weight of the router mounting platform 22 and any router 16 mounted thereon. Such counterbalancing mechanism includes a biasing element 68 for resiliently urging the router mounting platform 22 in an upwardly direction. Preferably, the biasing element 68 is provided in the form of an elongated coil spring 70. However, it will be apparent that other elastic elements can be substituted therefor.

In addition, various placements and configurations of the biasing element 68 can be imagined. For example, the biasing element 68 could be configured as an extensible coil spring surrounding any or all of the vertical shafts 48 and connected to the vertically translatable subassembly 50 so as to be put in tension under the weight of such vertically translatable subassembly 50. Alternatively, the biasing element 68 could be configured as a compressible coil spring surrounding any or all of the vertical shafts 48 and be positioned beneath the vertical bearings 52 so as to be compressed by the weight of the vertically translatable subassembly 50.

However, the present inventor has discovered that, in either of these or similar configurations, the resulting upward force exerted by the biasing element 68 is not as "linear" with respect to displacement as could be desired. Further, it has been discovered that a configuration utilizing a more elongated biasing element 68 produces a more desirable result.

To this end, the elongated coil spring 70 is extended over at least one, and preferably two, supporting members 72 which are positioned above the vertically translatable subassembly 50. The supporting members are preferably provided as pulleys 74 which are rotatably mounted on cross members, preferably in the form of spindles 76, extending between pairs of the vertical shafts 48 on opposite sides of and outward of the router mounting platform 22. The opposing ends of the elongated coil spring 70 are connected to a pair of end plates 78 which are, in turn, connected to the vertically translatable subassembly by their attachment to the four vertical bearings 52. The end plates 78, therefore, move with the vertically translatable subassembly 50. In the presently preferred embodiment, the ends of the coil spring 70 are provided with hooked portions 79 which hook over the lower edges of the end plates 78.

It has been found preferable to utilize, in addition to the four vertical bearings 52 already described, two additional vertical bearings 80 (also preferably of the slide block type). Each of the two additional vertical bearings 80 are slidably mounted on one of the four vertical shafts 48 above one of the four vertical bearings 52 and are vertically spaced therefrom. Thus, preferably, there are three each of the vertical bearings 52 and 80 that are positioned on each flanking side of the router mounting platform 22. A pair of longitudinal bars 82 run lengthwise connecting pairs of the vertical shafts 48 and providing an upper travel limit when the additional vertical bearings 80 contact the longitudinal bars 82.

Similarly, bolsters 84 are located at the bases of the vertical shafts 48 and adjacent the base member 46 to thereby limit the lower travel of the vertically translatable subassembly 50 by the contact of the vertical bearings 52 therewith.

A template clamping mechanism 86 is provided for clamping the template 12 to the template mounting platform 20. In the presently preferred embodiment, the template clamping mechanism 86 is provided in the form of four threaded template clamping screws 88. A workpiece clamping mechanism 90 is similarly provided for clamping the workpiece 14 to the workpiece mounting platform 18, presently preferred as being in the form of four threaded workpiece clamping screws 92.

Typically, a commercially available router has a base plate which is provided with screw holes, etc. to allow the router to be attached to an accessory such as a router table. The router mounting platform 22 is preferably configured to mate with the base plates of such routers through provision of appropriately placed screw holes 94, etc.

To allow the probe 26 to be conveniently traced over the three-dimensional contour of the template 12, each of the offset arms 28 and 34 is provided with an upstanding handle 96.

Preferably, the router 16 is of the so-called "plunge router" type, thereby allowing the router bit to be plunged into the workpiece 14 until the slack is removed from the plunge mechanism, whereupon the probe 26 is then moved down into contact with the template 12.

Figure 3:
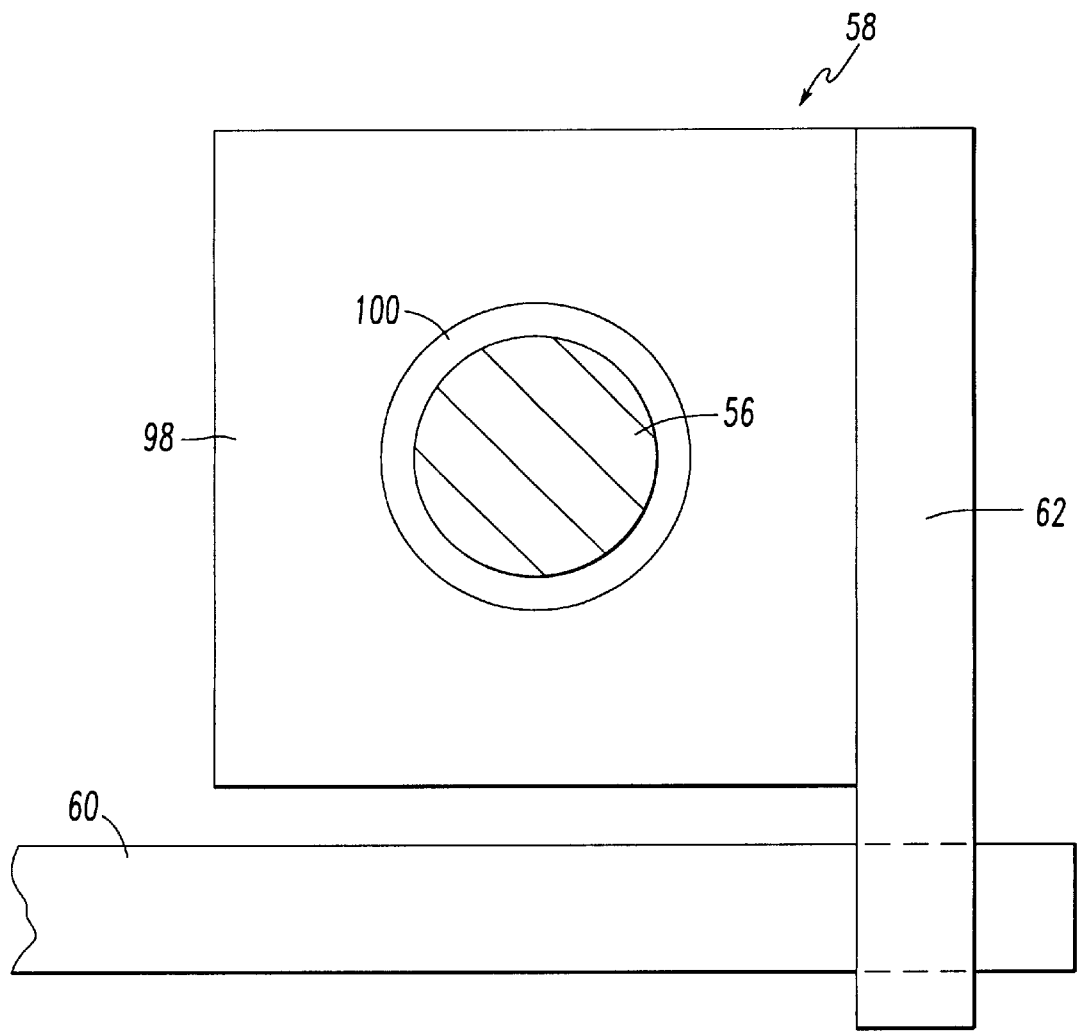
FIG. 3 is a detailed elevational view of a portion of FIG. 1, showing in detail a slide block bearing employed in the preferred embodiment of the invention.

FIG. 3 is a detailed enlarged view of a portion of FIG. 2, showing one of the first set of horizontal bearings 58, the flange member 62 connected thereto and one of the second set of horizontal shafts 60 extending from the flange member 62. The horizontal bearings 58, as well as all of the remaining slide block type bearings 52, 64 and 80, preferably include a pillow block 98 and a "ball binding bearing" 100 positioned within the pillow block, the ball binding bearing 100 sliding along the respective shaft 48, 56 or 60.

Applicant has achieved good results utilizing for the pillow blocks 98, ball binding bearings 100 and shafts 48, 56 and 60 the following components obtained from Thompson Industries, Inc.:

Pillow Blocks: Part No. SPB16

Ball Binding Bearings: Part No. B162536

Shafts: ground and hardened

In operation, a template 12 positioned in either template mounting platform 20 or 30 may be substantially duplicated into a workpiece 14 positioned in the workpiece mounting platform 18 by tracing the three-dimensional contour of the template 12 with the respective probe 26 or 32. In order to substantially duplicate the template, substantially the same or a similar set of router bits are used as were originally used in producing the template 12.

Additionally, however, the applicant has discovered that new and unusual patterns can be produced by fitting the router 16 with a different assortment of bits which vary from those used to produce the original template. Accordingly, the present invention can also be utilized to produce alternative and/or derivative designs by fitting the router 16 with different sets of bits.

While the present invention has been described by way of a detailed description of a particularly preferred embodiment, it will be readily apparent to those of ordinary skill in the art that various substitutions of equivalents may be affected without departing from the spirit or scope of the invention as set forth in the appended claims.

I claim:

1. A three-dimensional apparatus for a router for positioning and guiding the router to produce, from a workpiece, at least one of a substantial duplicate of a three-dimensional configuration of a template and a substantial variation of such three-dimensional configuration of such template by routing such workpiece, said three-dimensional apparatus for a router comprising:

a workpiece mounting platform for mounting such workpiece;

a template mounting platform for mounting such template;

a router mounting platform for mounting such router;

a router positioning mechanism for positioning said router mounting platform adjacent to said workpiece mounting platform;

a probe for tracing such three-dimensional configuration of such template; and a linkage interconnecting said probe and said router mounting platform to move said router mounting platform in response to movement of said probe;

said router positioning mechanism comprising three-dimensional movement means for permitting movement of said router mounting platform in each of three mutually orthogonal directions;

said three mutually orthogonal directions comprising a substantially vertical direction, a first substantially horizontal direction and a second substantially horizontal direction;

said router positioning mechanism comprising a suspension mechanism for suspending said router mounting platform substantially vertically above said workpiece mounting platform;

said suspension mechanism comprising:
a vertical translation mechanism for simultaneously moving said probe and said router mounting platform in said substantially vertical direction;
a first horizontal translation mechanism for simultaneously moving said probe and said router mounting platform in said first substantially horizontal direction; and
a second horizontal translation mechanism for simultaneously moving said probe and said router mounting platform in said second horizontal direction;
said vertical translation mechanism comprising at least one vertical shaft and at least one vertical bearing engaging said at least one vertical shaft;
said first horizontal translation mechanism comprising at least one first horizontal shaft and at least one first horizontal bearing engaging said at least one first horizontal shaft; and
said second horizontal translation mechanism comprising at least one second horizontal shaft and at least one second horizontal bearing engaging said at least one second horizontal shaft, said at least one second horizontal shaft being disposed at substantially a right angle with respect to said at least one first horizontal shaft.

2. A three-dimensional apparatus for a router, according to claim 1, wherein said three-dimensional apparatus for a router additionally comprises counterbalancing means for counterbalancing a substantial portion of a weight of said router mounting platform and such router when such router is mounted on said router mounting platform, such weight acting in said substantially vertical direction.

3. A three-dimensional apparatus for a router, according to claim 2, wherein said counterbalancing means includes a biasing element urging said router mounting platform in a substantially upward direction away from said workpiece mounting platform and substantially parallel to said substantially vertical direction.

4. A three-dimensional apparatus for a router, according to claim 3, wherein said linkage interconnecting said probe and said router mounting platform includes a substantially rigid member interconnecting said probe and said router mounting platform.

5. A three-dimensional apparatus for a router, according to claim 4, wherein said linkage interconnecting said probe and said router mounting platform comprises an offset arm, said offset arm projecting outward from said router mounting platform, said probe being mounted on said offset arm and extending toward said template mounting platform.

6. A three-dimensional apparatus for a router for positioning and guiding the router to produce, from a workpiece, at least one of a substantial duplicate of a three-dimensional configuration of a template and a substantial variation of such three-dimensional configuration of such template by routing such workpiece, said three-dimensional apparatus for a router comprising:
a workpiece mounting platform for mounting such workpiece;
a template mounting platform for mounting such template;
a router mounting platform for mounting such router;
a router positioning mechanism for positioning said router mounting platform adjacent to said workpiece mounting platform;
a probe for tracing such three-dimensional configuration of such template; and
a linkage interconnecting said probe and said router mounting platform to move said router mounting platform in response to movement of said probe;
said router positioning mechanism comprising three-dimensional movement means for permitting movement of said router mounting platform in each of three mutually orthogonal directions;
said three mutually orthogonal directions comprising a substantially vertical direction, a first substantially horizontal direction and a second substantially horizontal direction, and said router positioning mechanism comprising a suspension mechanism for suspending said router mounting platform substantially vertically above said workpiece mounting platform;
wherein said three-dimensional apparatus for a router additionally comprises counterbalancing means for counterbalancing a substantial portion of a weight of said router mounting platform and such router when such router is mounted on said router mounting platform, such weight acting in said substantially vertical direction;
wherein said counterbalancing means comprises a biasing element urging said router mounting platform in a substantially upward direction, away from said workpiece mounting platform and substantially parallel to said substantially vertical direction;
wherein said linkage interconnecting said probe and said router mounting platform comprises a substantially rigid member interconnecting said probe and said router mounting platform;
wherein said linkage interconnecting said probe and said router mounting platform comprises an offset arm, said offset arm projecting outward from said router mounting platform, said probe being mounted on said offset arm and extending toward said template mounting platform;
wherein said suspension mechanism comprises:
a vertical translation mechanism for simultaneously moving said probe and said router mounting platform in said substantially vertical direction;
a first horizontal translation mechanism for simultaneously moving said probe and said router mounting platform in said first substantially horizontal direction; and
a second horizontal translation mechanism for simultaneously moving said probe and said router mounting platform in said second horizontal direction; and
wherein said vertical translation mechanism comprises at least one vertical shaft and at least one vertical bearing engaging said at least one vertical shaft, wherein said first horizontal translation mechanism comprises at least one first horizontal shaft and at least one first horizontal bearing engaging said at least one first horizontal shaft and wherein said second horizontal translation mechanism comprises at least one second horizontal shaft and at least one second horizontal bearing engaging said at least one second horizontal shaft, said at least one second horizontal shaft being disposed at substantially a right angle with respect to said at least one first horizontal shaft.

7. A three-dimensional apparatus for a router, according to claim 6, wherein said vertical translation mechanism includes a plurality of vertical shafts and a plurality of vertical bearings, at least one each of said plurality of vertical bearings engaging one each of said plurality of vertical shafts.

8. A three-dimensional apparatus for a router, according to claim 7, wherein said first horizontal translation mechanism includes a first plurality of horizontal shafts and a first plurality of horizontal bearings, at least one each of said first plurality of horizontal bearings engaging one each of said first plurality of horizontal shafts.

9. A three-dimensional apparatus for a router, according to claim 8, wherein said second horizontal translation mechanism includes a second plurality of horizontal shafts, said second plurality of horizontal shafts being disposed at substantially right angles with respect to said first plurality of horizontal shafts, and a second plurality of horizontal bearings, at least one each of said second plurality of horizontal bearings engaging one each of said second plurality of horizontal shafts.

10. A three-dimensional apparatus for a router, according to claim 11, wherein at least one each of said vertical bearings slidingly engage one each of said first plurality of vertical shafts, wherein at least one each of said first plurality of horizontal bearings slidingly engage one each of said first plurality of horizontal shafts and wherein at least one each of said second plurality of horizontal bearings slidingly engage one each of said second plurality of horizontal shafts.

11. A three-dimensional apparatus for a router, according to claim 10, wherein said three-dimensional apparatus for a router additionally includes a second template mounting platform, a second probe and an additional offset arm projecting outward from said router mounting platform, said second probe being mounted on said second offset arm and extending toward said second template mounting platform and said first and second template mounting platforms being disposed on opposite sides of said workpiece mounting platform.

12. A three-dimensional apparatus for a router, according to claim 11, said three-dimensional apparatus for a router additionally includes a frame portion and a vertically translatable subassembly, said vertically translatable subassembly including:
   said router mounting platform;
   said first horizontal translation mechanism; and
   said second horizontal translation mechanism;
   said vertical translation mechanism being operative to permit movement of said vertically translatable subassembly in said substantially vertical direction with respect to said frame portion;
   and wherein said biasing element includes an elongated elastic member.

13. A three-dimensional apparatus for a router, according to claim 12, said three-dimensional apparatus for a router additionally includes a support member disposed above said vertically translatable subassembly, said elongated elastic member having two opposing ends, said two opposing ends of said elongated elastic member being connected to said vertically translatable subassembly and said elongated elastic member extending over said support member.

14. A three-dimensional apparatus for a router, according to claim 13, wherein said support member includes at least one pulley.

15. A three-dimensional apparatus for a router, according to claim 14, wherein said at least one pulley includes at least two pulleys, said at least two pulleys being disposed on opposing sides of said router mounting platform and each of said at least two pulleys being disposed outward of said router mounting platform.

16. A three-dimensional apparatus for a router, according to claim 15, wherein said first plurality of vertical shafts includes four vertical shafts, said first plurality of vertical bearings includes at least four vertical bearings, one each of said at least four vertical bearings slidingly engages one each of said four vertical shafts, said vertically translatable subassembly additionally includes said at least four vertical bearings and each of said at least four vertical bearings includes a slide block bearing slidingly engaging one of said four vertical shafts.

17. A three-dimensional apparatus for a router, according to claim 16, wherein said vertically translatable subassembly additionally includes a pair of end plates, a first of said pair of end plates extending substantially between a first two of said at least four vertical bearings, a second of said pair of end plates extending substantially between a second two of said at least four vertical bearings, wherein one each of said two opposing ends of said elongated elastic member are connected to one each of said pair of end plates and wherein said elongated elastic member includes an elongated coil spring member.

18. A three-dimensional apparatus for a router, according to claim 17:
   wherein said at least four vertical bearings includes six vertical bearings, a first pair of said six vertical bearings being vertically spaced from one another and slidingly engaging a first of said four vertical shafts, a second pair of said six vertical bearings being vertically spaced from one another and slidingly engaging a second of said four vertical shafts and one each of said six vertical bearings slidingly engaging one each of a third and fourth of said four vertical shafts;
   wherein each of said first plurality of horizontal bearings includes a slide block bearing slidingly engaging one of said first plurality of horizontal shafts and each of said second plurality of horizontal bearings includes a slide block bearing slidingly engaging one of said second plurality of horizontal shafts;
   wherein said second plurality of horizontal bearings includes at least two horizontal bearings slidingly engaging a first of said second plurality of horizontal shafts and at least an additional two horizontal bearings slidingly engaging a second of said second plurality of horizontal shafts;
   wherein said offset arm and said additional offset arm extend outward substantially along a single line from said router mounting platform;
   wherein said frame includes a base member, said four vertical shafts are connected to and extend upward from said base member;
   wherein said three-dimensional apparatus for a router additionally includes a pair of cross members, one each of said pair of cross members extending between two of said four vertical shafts, one each of said at least two pulleys being mounted on one each of said pair of cross members and said coil spring member extending over said at least two pulleys and transverse to said single line of said offset arm and said additional offset arm;
   wherein said workpiece mounting platform includes a workpiece clamping mechanism for clamping such workpiece to said base member, said template mounting platform includes a template clamping mechanism for clamping such template to said base member, said second template mounting platform includes a second template clamping mechanism for clamping another such template to said base member and wherein said router mounting platform includes a router attachment means for securing such router to said router mounting platform;

wherein each of said end plates of said vertically translatable subassembly is connected to three of said six vertical bearings;

wherein said three-dimensional apparatus for a router additionally includes a handle extending upward from said offset arm on an opposite side of said offset arm from said probe, an additional handle extending upward from said additional offset arm on an opposite side of said additional offset arm from said second probe, a bolster disposed at the intersection of each of said four vertical shafts and said base member and a pair of strap members, one each of said pair of strap members extending between pairs of said vertical shafts and said strap members extending substantially parallel to said coil spring;

wherein said vertically translatable subassembly has an upward limit of travel position wherein one each of said first pair and said second pair of said vertical bearings contacts one of said pair of strap members; and wherein said vertically translatable subassembly has a downward limit of travel position wherein one each of said first pair and said second pair of said vertical bearings contacts one of bolsters.

19. A three-dimensional duplicating milling apparatus for mounting a milling tool and for producing, in a workpiece, at least one of a substantial reproduction of a template and a substantial variation of such template, such template extending along three separate and independent axes, said milling apparatus comprising:

at least one template platform for mounting such template in a template position;

a workpiece platform for mounting such workpiece in a workpiece position;

a milling tool support structure for mounting such milling tool in a milling tool position;

probe means for determining a surface of such workpiece with respect to said workpiece position; and linkage means for determining said milling tool position in response to said determined surface of such workpiece;

such template having three separate and independent axes; and said linkage means being effective to alter said milling tool position in each of said three separate and independent axes with respect to a position of said probe;

said linkage means comprising:

a vertical translation mechanism comprising at least one vertical shaft and at least one vertical bearing engaging said at least one vertical shaft;

a first horizontal translation mechanism comprising at least one first horizontal shaft and at least one first horizontal bearing engaging said at least one first horizontal shaft; and a second horizontal translation mechanism comprising at least one second horizontal shaft and at least one second horizontal bearing engaging said at least one second horizontal shaft.

20. A three-dimensional duplicating milking apparatus, according to claim 19, wherein said at least one second horizontal shaft is disposed at substantially a right angle with respect to said at least one first horizontal shaft.

21. A three-dimensional apparatus for a router, according to claim 20, wherein:

said at least one vertical bearing comprises a plurality of vertical bearings engaging said at least one vertical shaft;

said at least one first horizontal bearing comprises a plurality of first horizontal bearings engaging said at least one first horizontal shaft;

said at least one second horizontal bearing comprises a plurality of second horizontal bearings engaging said at least one second horizontal shaft.

22. A three-dimensional apparatus for a router, according to claim 21, wherein:

said plurality of vertical bearings comprises at least two vertical bearings engaging said at least one vertical shaft;

said plurality of first horizontal bearings comprises at least two first horizontal bearings engaging said at least one first horizontal shaft; and said plurality of second horizontal bearings comprises at least four second horizontal bearings engaging said at least one second horizontal shaft.

* * * * *